United States Patent [19]

Rogic et al.

[11] 4,097,517

[45] Jun. 27, 1978

[54] CLEAVAGE OF ALPHA-OXIMINOKETONES, ALDEHYDES AND ACETALS AND THEIR NITROSO ISOMERS

[75] Inventors: Milorad M. Rogic, Whippany; Timothy R. Demmin, Morris Plains, both of N.J.; Karl P. Klein, Alexandria, Va.

[73] Assignee: Allied Chemical Corporation, Morris Township, Morris County, N.J.

[21] Appl. No.: 722,249

[22] Filed: Sep. 10, 1976

[51] Int. Cl.$^2$ .......................................... C07C 120/00
[52] U.S. Cl. ........................ 260/465.4; 260/465.1; 260/611 R; 260/615 A; 560/240; 260/404
[58] Field of Search ............... 260/465.4, 465.1, 465.7

[56] References Cited

U.S. PATENT DOCUMENTS

| | | | |
|---|---|---|---|
| 2,999,875 | 9/1961 | Ferris et al. | 260/465.4 |
| 3,059,018 | 10/1962 | Johnson et al. | 260/465.4 |
| 3,839,407 | 10/1974 | Rogic et al. | 260/465.4 |
| 4,045,422 | 8/1977 | Rogic et al. | 260/464 |

OTHER PUBLICATIONS

Rogic, et al.; J.A.C.S., vol. 99 (1977), pp. 1156–1171.
Smith, "The Chemistry of Open-Chain Organic Nitrogen Compounds", vol. II (1966), pp. 355–358 and 361–362.
Migrdichian, "Organic Synthesis", vol. 1, (1957), p. 376.

Primary Examiner—Joseph Paul Brust
Attorney, Agent, or Firm—Robert A. Harman

[57] ABSTRACT

The cleavage forms an ester group and a cyano group. It is effected by use of an ortho ester of a carboxylic acid, or reaction product thereof with the oximino compound or with a Lewis acid such as boron trifluoride in an electrophilic reaction medium. In particular alpha-oximinocyclohexanone dimethyl acetal is cleaved to form omega-cyano methyl valerate by catalytic action of dimethoxy ethylcarbonium tetrafluoroborate in dichloromethane solvent. The cyclic $C_5$, $C_8$, and $C_{12}$ homologues react similarly; likewise the alkyl-substituted homologues and the nitroso isomers.

13 Claims, No Drawings

CLEAVAGE OF ALPHA-OXIMINOKETONES, ALDEHYDES AND ACETALS AND THEIR NITROSO ISOMERS

BACKGROUND OF THE INVENTION

This invention relates to reactions whereby the oximino group of an alpha-oximinoketone, aldehyde or acetal (or the nitroso group of the nitroso isomer thereof) is converted to a cyano group; and the ketone, aldehyde or acetal group is converted to an ester group.

Especially the invention relates to process whereby an alpha-oximinocyclohexanone dimethyl acetal is converted to the corresponding methyl omega-cyanovalerate, or alternatively the dimer of the alpha-nitrosocyclohexanone dimethyl acetal is converted to said methyl omega-cyanovalerate.

It is known to convert alpha-oximinoketones such as benzil monoxime to cyano compound and carboxylic acid upon cleavage of the action of reagent quantities of certain agents such as an aryl sulfonic acid chloride in alkaline medium or in pyridine. The reaction is an example of the so-called Beckmann rearrangement of the second order or Beckmann fragmentation (*Organic Synthesis*, Migrdichian — Reinhold 1957 — page 376). Disadvantages of such processes include loss by decomposition of the fragmentation reagent, and need to employ forced cooling to subnormal temperatures to obtain good yield.

Moreover, it is known to produce the acetals of alpha-oximinocyclohexanone of the general formula $R_1C_6H_7(NOH)(OR_2)(OR_3)$; and known that these acetals afford the corresponding alkyl omega-cyanovalerate upon conventional Beckmann fragmentation. The group $R_1$ can be hydrogen, $C_1-C_4$ alkyl, or phenyl; and the the groups $R_2$ and $R_3$ can be independently $C_1-C_{10}$ alkyl, cyclohexyl, or $C_1-C_4$ alkyl cyclohexyl, or together can form a ring with the two oxygen atoms and the ring carbon atom of the acetal group. (U.S. application Ser. No. 460,836 of Rogic et al. filed Apr. 15, 1974, now abandoned; and corresponding West German patent publication DOS No. P. 2,515,238.9 laid open Oct. 15, 1975.) Such acetals are formed by first converting the cyclohexanone to its alkyl enol ether as known in the art (U. Schmidt et al., Annalen Der Chemie, volume 656 of 1962, page 97 at page 100-101). Then the alkyl nitrite having the alkyl group desired in the acetal is dissolved in an inert electrophilic reaction medium, e.g. an inert, nonpolar solvent such as benzene, chloroform or carbon tetrachloride containing a catalytic quantity of an acid, such as especially boron trifluoride etherate. Liquid sulfur dioxide with or without an acid catalyst also functions as the electrophilic reaction medium. The alkyl enol ether is added to this nitrite solution, suitably at reduced temperature. The product is the dimer of alpha-nitrosocyclohexanone dialkyl acetal. This can be isomerized to the alpha-oximinocyclohexanone dialkyl acetal by heating above the melting point, by heating in an inert solvent, or by holding at room temperature in hydroxylic solvent such as methanol or ethanol in presence of a catalytic quantity of base.

Also known is the production of omega-cyanovalerate from cyclohexanone dialkyl acetal, in a polar aprotic solvent such as liquid sulfur dioxide, by action of nitrous acid alkyl ester plus an alchohol plus catalytic quantities of an acid such as dry hydrogen chloride or boron trifluoride etherate (U.S. Pat. No. 3,839,407 of Oct. 1, 1974 to Rogic and Vitrone). This process represents a valuable approach to production of cyano esters, but requires a large recycle of alcohol and sulfur dioxide solvent and has been found to produce small amounts of by-product, for example, ethyl 6,6-diethoxyhexanoate together with the desired ethyl omega-cyanovalerate, when the reaction conditions are not rigorously anhydrous.

SUMMARY OF THE INVENTION

The present invention provides a process for the cleavage of the above-indicated compounds, namely, the alpha-oximino ketones and aldehydes and the acetals thereof and the alpha-nitroso isomers of the ketones and aldehydes and acetals. In the present process high yields up to essentially quantitative yields of the desired cyano ester are obtained without need for cooling other than by heat losses to the atmosphere or by boiling of the solvent, and the processes do not involve decomposition of the reagent or catalyst which is used.

In accordance with the present invention, cleavage is accomplished in an alpha-oximinoketone, aldehyde, or acetal thereof, or in the alpha-nitroso isomer of such compound, at the bond joining the carbon atom bearing the oxime or nitroso group and the carbonyl carbon atom or dialkoxy substituted carbon atom of an acetal of such carbonyl group. The process comprises contacting the said alpha-oximino or alpha-nitroso compound with an ortho ester of a carboxylic acid in an inert liquid electrophilic reaction medium for a time such that the cleavage reaction of the said bond occurs at the prevailing temperature and pressure with formation of a cyano group and an ester group.

By an electrophilic reaction medium we mean a medium which has the capacity to bind electrons. This electrophilicity can be provided by a single substance such as particularly a polar aprotic solvent, especially liquid sulfur dioxide; or can be provided by an acid-acting substance in the nonpolar inert medium such as catalytic quantity of an acid in benzene, chloroform, carbon tetrachloride or other nonpolar inert medium. In this connection the acid need not be one that releases a proton but more broadly can be a Lewis acid such as especially boron trifluroide or a carbonium ion salt of boron tetrafluoride, in particular an O-alkylated ester fluoroborate. Moreover, the ortho ester specified can be added in reagent quantities or in excess (serving as reaction medium) or in catalytic quantities, and can be added as such or as an adduct of the oximino group; or as a reaction product with the Lewis acid such as the reaction product of an ortho ester and boron trifluoride, namely an O-alkylated ester fluoroborate.

When catalytic quantities are referred to herein, generally these are to be understood in a conventional sense, namely as being in the range of about 1-10 mol percent based on the oximino compound or its nitroso isomer.

Our process is adapted to the cleavage of the specified bond in an open chain alpha-oximinoketone or aldehyde structure and in particular in a cyclic alpha-oximinoketone structure such as alpha-oximinocyclohexanone or its dimethyl acetal or the alpha-nitroso dimer thereof. Equally well, the ring can be $C_5$, $C_6$, $C_8$ or $C_{12}$. Other than the oximino (or nitroso) and acetal groups, the compound will in general contain no substituents except permissibly alkyl and chloro.

The cyano compounds produced by the process of this invention can be converted as is known to organic acids and organic amines which have a variety of known utilities. The cyclic compounds afford omega-cyano esters which can be converted to omega-amino carboxylic acids and lactams useful in the production of polyamide polymers.

PREFERRED EMBODIMENTS

In its preferred embodiments our invention is applied to alpha-oximinocyclohexanone dimethyl acetal or to the corresponding alpha-nitroso dimer. Catalytic quantities of an ortho acetate or ortho propionate ester of methanol are used. The examples which follow illustrate such preferred embodiments and also other embodiments indicative of the scope of the invention.

EXAMPLES

The table below shows illustrative specific embodiments of our invention and of the best mode contemplated by us for carrying out our invention. The oxime the reaction mixture is basic and distilling to remove methanol co-product; then purifying by vacuum fractionation.

Acid catalysts are used in conventional quantities, e.g. 0.05 mol per mol of reactant.

In the table "RT" signifies room temperature initiation, and no forced cooling. Temperatures given under "Conditions" in the table are in ° C.

The products shown in the table were determined from the 60-MHz spectrum, and were confirmed in some of the experiments by gas-liquid chromatography ("GLC").

In the table, each reactant compound cleaved, and various products reported, are accompanied at the first occurrence in the table by identifying numbers, in parentheses and underlined. Thereafter throughout the table, the same substance is identified by that same number.

| Table Ex. | Reactant Compound Cleaved | Reagent (and mols per mol of reactant) | Solvent | Catalyst | Conditions | Products (% of Theory) |
|---|---|---|---|---|---|---|
| 1 | (1) | CH(O Me)$_3$ (0.1 mol) | CHCl$_3$ | CH$_3$SO$_3$H | 75° | (10) H$_2$(40%) + (11) (60%) |
| 2 | (2) | None | CCl$_4$ or CHCl$_3$ or SO$_2$ (liquid) | CH$_3$SO$_3$H None | RT, 24 hr. | (10) + CH(O Me)$_3$ (90%) (90%) (12) |
| 3(a) | (3) | None | CHCl$_3$ | CH$_3$SO$_3$H | RT (exothermic) | (10) (30%) + (12) (30%) (13) C(O Me)$_3$ + CN (70%) MeCOO Me (70%) |
| 3(b) | (3) | | CH$_3$C(OMe)$_3$ and CCl$_4$ | CH$_3$SO$_3$H | RT, 1 hr. then make basic with MeONa and distil | (13) (90%) |
| 4 | (3) | MeC(O Me)$_3$ (2 mols) | CCl$_4$ | CH$_3$SO$_3$H | RT | (13) (>90%) |
| 5 | (1) | MeC(O Me)$_3$ (0.1 mol)$^3$ | C$_6$H$_6$ | CH$_3$SO$_3$H | 80° | (10) (93%) + (13) (3%) |
| 6* | (1) | (13) (1 mol) | CCl$_4$ | None | 80°, 24 hr. | (10)(>95%) + (13)(>95%) (recovered) |
| 7 | (1) | (13) (1 mol) | CCl$_4$ | CH$_3$SO$_3$H | RT, <30 min. | (10)(>95%) + (13)(>95%) (recovered) |
| 8 | (1) | (13) (0.05 mol) | C$_6$H$_6$ | CH$_3$SO$_3$H | 80°, 4 hr. | (10) (>95%) |
| 9 | (4) | None | CHCl$_3$ | CH$_3$SO$_3$H | RT, fast | (10) (high yield) + HCOOMe |

*Comparisons adducts of ortho esters, compounds (2), (3) of the table, are produced by heating the oxime at about 100° C. in excess ortho ester; then adding sodium methoxide until We have found that alpha-oximinocyclohexanone is readily prepared from its acetal (Reactant (1) of Example 1 above) by hydrolysis, e.g. by dissolving the acetal in aqueous isopropanol containing trace quantities of HCl. Only one of the two possible oxime stereoisomers is formed. This can be converted with trimethyl orthoformate by the previously noted procedure to the oxime/trimethyl orthoformate adduct (4) employed in Example 9 above.

Other alpha-oximinocycloalkanone acetals can be cleaved similarly. Illustrative examples are the compounds in which the ring is cyclopenta-, 4-t-butylcyclohexa-, 3-chlorocyclohexa-, cyclooca-, and cyclododeca-.

Acetals of unsubstituted ketones and aldehydes can be prepared, as is known, by acid-catalyzed reaction between an o-formate ester and the carbonyl group. The open chain alpha-oximino ketones and aldehydes can be converted by this method, using the corresponding alcohol as reaction medium, to the alpha-oximino acetals. Benzil monoxime similarly affords oximino acetal. These oximino acetals are converted by heating with excess ortho ester, suitably in presence of acid catalyst, to the ortho ester/oxime adduct. The reaction medium is neutralized and distilled to remove the alcohol co-product; then is fractionated under vacuum to purify the oxime/ortho ester adduct. Such open chain adduct of an alpha-oximino acetal is cleaved in inert electrophilic reaction medium, in accordance with this invention, to produce a nitrile and an ester as the resulting fragments. The following equations represent illustrative examples showing specific details of solvent, catalyst, conditions and products,

EXAMPLE 10

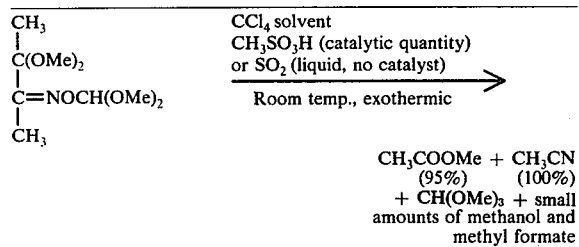

EXAMPLE 11

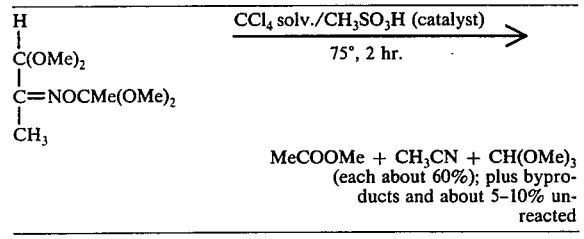

We have found that the dimers of alpha-nitrosocycloalkanone acetals (i.e. the dimers of the alpha-nitroso isomers of the alpha-oximinocycloketone acetals above discussed and exemplified) can be cleaved to produce a cyano group and an ester group at the site of cleavage, similarly to the above alpha-oximinocycloalkanone acetals. The following equation represents an illustrative example, showing specific details of solvent, catalyst, conditions and products.

EXAMPLE 12

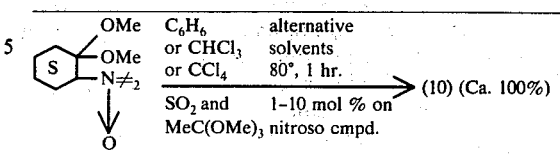

A highly effective type of catalyst for use with ortho esters, to convert alpha-oximino acetals and dimers thereof to cyano esters in accordance with this invention, is the combination of boron trifluoride with an ortho-ester, e.g. in the form of an O-alkylated ester fluoroborate obtained under dry conditions as described by R. F. Borch, Jour. of Organic Chemistry vol. 34, p. 627 (1969). The following equation represents a specific illustrative example of such cleavage of alpha-oximinocyclohexanone dimethyl acetal (1).

EXAMPLE 13

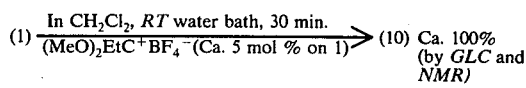

Upon making basic with MeONa and distilling, recovery of (10) is Ca. 93%.

EXAMPLES 14–17

The alpha-oximino dimethyl acetals of cyclopentanone, (Ex. 14), 4-tert.butylcyclohexanone (Ex. 15), cyclooctanone (Ex. 16), and cyclododecanone (Ex. 17) reacted in the same way to give high yields of the corresponding cyano esters.

We claim:

1. Process for cleavage, in an alpha-oximino-ketone, aldehyde or acetal, or in the monomeric or dimeric alpha-nitroso isomer of such compound, of the bond joining (a) the carbon atom bearing the oxime or nitroso group and (b) the carbonyl carbon atom or dialkoxy substituted carbon atom of an acetal of such carbonyl group, which process comprises: contacting said alpha-oximino ketone, aldehyde or dialkyl acetal having no substituents except permissibly alkyl and chloro, or the monomeric or dimeric alpha-nitroso isomer thereof with at least one reagent of the group consisting of ortho esters of carboxylic acids and reaction products of such ortho esters with Lewis acids — or maintaining a solution of an adduct of such ortho ester with such oximino compound — in an inert liquid electrophilic reaction medium for a time such that the cleavage reaction occurs at the prevailing temperature and pressure with formation of a cyano group and an ester group.

2. Process of claim 1 wherein an ortho ester is employed in amounts at least about equivalent to the oximino or nitroso group.

3. Process of claim 1 wherein the ortho ester is employed in amounts of 1–10 mol percent based on the oximino or nitroso compound.

4. Process of claim 1 wherein the bond cleaved is a bond in a carbocyclic ring.

5. Process of claim 4 wherein the carbocyclic ring is a $C_5$, $C_6$, $C_8$ or $C_{12}$ ring.

6. Process of claim 4 wherein the ring is $C_6$ and contains, in addition to the specified functional groups, no substituents other than alkyl and chloro substituents; the liquid reaction medium comprises sulfur dioxide or is benzene, chloroform, carbon tetrachloride or dichloromethane containing a catalytic quantity of a Lewis acid; and the ortho ester reagent, employed as such or as its adduct with the oximino compound or as reaction product with a Lewis acid, is the ortho acetate or ortho propionate ester of methanol.

7. Process of claim 6 wherein the compound cleaved is alpha-oximinocyclohexanone dimethyl acetal and the reaction medium contains dissolved acid.

8. Process of claim 7 wherein the ortho ester is present in catalytic quantities.

9. Process of claim 8 wherein the compound cleaved is alpha-oximinocyclohexanone dimethyl acetal and the ortho ester is trimethyl ortho acetate.

10. Process of claim 1 wherein the compound cleaved is the dimer of alpha-nitrosocyclohexanone dimethyl acetal and the reaction medium contains catalytic quantities of sulfur dioxide and of trimethyl ortho acetate.

11. Process of claim 1 wherein a catalytic quantity of boron trifluoride as such or as an acid-acting complex provides electrophilicity in the reaction medium.

12. Process of claim 11 wherein O-alkylated ester fluoroborate in catalytic quantities provides the ester component and the electrophilic component in the reaction medium.

13. Process of claim 12 wherein the compound cleaved is alpha-oximinocyclohexanone dimethyl acetal or the monomeric or dimeric alpha-nitroso isomer thereof; the reaction medium is benzene, chloroform, carbon tetrachloride or dichloromethane; and the O-alkylated ester fluoroborate is derived from the ortho acetate or ortho propionate ester of methanol.

* * * * *